United States Patent
Ghosh et al.

(10) Patent No.: US 11,849,421 B2
(45) Date of Patent: Dec. 19, 2023

(54) METHODS TO AVOID SOUNDING REFERENCE SIGNAL SUSPENSION DUE TO MULTI-SUBSCRIBER PAGING OCCASION COLLISION

(71) Applicant: QUALCOMM Incorporated, San Diego, CA (US)

(72) Inventors: Priyangshu Ghosh, Hyderabad (IN); Akash Srivastava, Hyderabad (IN); Rajeev Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 17/554,507

(22) Filed: Dec. 17, 2021

(65) Prior Publication Data

US 2023/0199692 A1    Jun. 22, 2023

(51) Int. Cl.
*H04W 60/02*     (2009.01)
*H04L 5/00*      (2006.01)
*H04W 68/02*     (2009.01)

(52) U.S. Cl.
CPC ........... *H04W 60/02* (2013.01); *H04L 5/0051* (2013.01); *H04W 68/02* (2013.01)

(58) Field of Classification Search
CPC ...... H04W 60/02; H04W 68/02; H04L 5/0051
See application file for complete search history.

(56) References Cited

U.S. PATENT DOCUMENTS

2010/0136903 A1* 6/2010 Lee .................. H04L 25/03343
                                                         455/17
2020/0374833 A1* 11/2020 Guo .................... H04W 88/06

FOREIGN PATENT DOCUMENTS

EP        3742831 A1   11/2020
WO   WO-2021145611 A1   7/2021
WO   WO-2021204548 A1   10/2021

OTHER PUBLICATIONS

Intel Corporation : "5G-S-TMSI re-assignment is "Enough" for Paging Collision Avoidance in 5GS", 3GPP TSG-RAN WG2 Meeting #114-e, R2-2106102, 3rd Generation Partnership Project (3GPP), Mobile Competence Centre, 650, Route Des Luciples, F-06921 Sophia-Antipolis Cedex, France, vol. RAN WG2, No. Electronic Meeting, May 19, 2021-May 27, 2021, May 11, 2021, XP052007462, 3 Pages, The Whole Document.

(Continued)

*Primary Examiner* — Nader Bolourchi
(74) *Attorney, Agent, or Firm* — Holland & Hart LLP

(57) ABSTRACT

Methods, systems, and devices for wireless communications are described. Some user equipment (UE) may be equipped with multiple subscriber identity modules (SIMs). A multi-SIM UE may receive a control message at a first SIM which indicates a set of sounding reference signal (SRS) resources for receiving SRS according to a first periodicity. The UE may also receive a registration message at a second SIM which includes a first parameter indicating a first set of paging occasions for receiving paging messages in accordance with a second periodicity. The UE may identify a collision in time between the one or more SRS resources and paging resources, and may transmit a registration request message to a base station. The UE may then receive a second registration message which includes a second parameter for calculating a second set of paging occasions that have a third periodicity that are non-overlapping with the SRS resources.

30 Claims, 12 Drawing Sheets

(56) References Cited

OTHER PUBLICATIONS

International Search Report and Written Opinion—PCT/US2022/081093—ISA/EPO—dated Mar. 13, 2023.

* cited by examiner

METHODS TO AVOID SOUNDING REFERENCE SIGNAL SUSPENSION DUE TO MULTI-SUBSCRIBER PAGING OCCASION COLLISION

FIELD OF TECHNOLOGY

The following relates to wireless communications, including methods to avoid sounding reference signal (SRS) suspension due to multi-subscriber paging occasion collision.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications networks, devices such as UEs may have multiple subscriber identify module (SIM) capabilities to support increased throughput and overall enhanced user experience. Some communications techniques for multi-SIM capable devices, however, may be deficient.

SUMMARY

The described techniques relate to improved methods, systems, devices, and apparatuses that support methods to avoid sounding reference signal (SRS) suspension due to multi-subscriber paging occasion collision. Generally, the described techniques provide for increased signaling throughput for devices having multiple subscriber identity module (SIM) capabilities. For example, a devices such as a user equipment (UE) may be a multi-SIM UE which may communicate via multiple different services with other devices in a wireless communications network. In such cases, a first SIM of the UE may be configured to receive SRS signaling via a set of SRS occasions, and a second SIM of the UE may be configured to periodically receive paging messages during a set of paging occasions. In some cases, however, one or more SRS occasions may overlap in time with one or more paging occasions, causing a resource collision which may cause the UE to suspend SRS signaling.

To account for SRS and paging collisions based on the multi-SIM capabilities of the UE, upon identifying a collision between SRS resources and paging occasions occurring on different SIMs, the UE may transmit a registration update request message to the network to request an updated registration. In response to the registration update request message, the UE may receive a registration accept message which includes a new or updated temporary mobile subscriber identity (TMSI), which the UE may use to calculate a new periodicity for paging occasions on the second SIM that are non-overlapping with SRS occasions of the first SIM.

A method for wireless communication at a UE is described. The method may include receiving, by a first SIM of the UE, a control message indicating a set of SRS resources for one or more SRSs in accordance with a first periodicity, receiving, at a second SIM of the UE, a registration message including a first parameter that indicates a first set of paging occasions for one or more paging messages in accordance with a second periodicity, transmitting, to a base station, a registration request message based on a collision in time between a SRS resource of the set of SRS resources and a paging occasion of the set of paging occasions, and receiving, from the base station, a second registration message in response to the registration request message, the second registration message including a second parameter that indicates a second set of paging occasions for the one or more paging messages in accordance with a third periodicity.

An apparatus for wireless communication at a UE is described. The apparatus may include a processor, memory coupled with the processor, and instructions stored in the memory. The instructions may be executable by the processor to cause the apparatus to receive, by a first SIM of the UE, a control message indicating a set of SRS resources for one or more SRSs in accordance with a first periodicity, receive, at a second SIM of the UE, a registration message including a first parameter that indicates a first set of paging occasions for one or more paging messages in accordance with a second periodicity, transmit, to a base station, a registration request message based on a collision in time between a SRS resource of the set of SRS resources and a paging occasion of the set of paging occasions, and receive, from the base station, a second registration message in response to the registration request message, the second registration message including a second parameter that indicates a second set of paging occasions for the one or more paging messages in accordance with a third periodicity.

Another apparatus for wireless communication at a UE is described. The apparatus may include means for receiving, by a first SIM of the UE, a control message indicating a set of SRS resources for one or more SRSs in accordance with a first periodicity, means for receiving, at a second SIM of the UE, a registration message including a first parameter that indicates a first set of paging occasions for one or more paging messages in accordance with a second periodicity, means for transmitting, to a base station, a registration request message based on a collision in time between a SRS resource of the set of SRS resources and a paging occasion of the set of paging occasions, and means for receiving, from the base station, a second registration message in response to the registration request message, the second registration message including a second parameter that indicates a second set of paging occasions for the one or more paging messages in accordance with a third periodicity.

A non-transitory computer-readable medium storing code for wireless communication at a UE is described. The code may include instructions executable by a processor to receive, by a first SIM of the UE, a control message indicating a set of SRS resources for one or more SRSs in accordance with a first periodicity, receive, at a second SIM of the UE, a registration message including a first parameter that indicates a first set of paging occasions for one or more paging messages in accordance with a second periodicity, transmit, to a base station, a registration request message based on a collision in time between a SRS resource of the set of SRS resources and a paging occasion of the set of paging occasions, and receive, from the base station, a second registration message in response to the registration request message, the second registration message including a second parameter that indicates a second set of paging occasions for the one or more paging messages in accordance with a third periodicity.

In some examples of the method, apparatuses, and non-transitory computer-readable medium described herein, the first parameter includes a first temporary mobile subscriber identity (TMSI) and the second parameter includes a second TMSI and the method, apparatuses, and non-transitory computer-readable medium may include further operations, features, means, or instructions for determining the first and second set of paging occasions for the one or more paging messages based on the respective first and second temporary mobile subscriber identities and determining the third periodicity based on the second TMSI associated with the second set of paging occasions.

In some examples of the method, apparatuses, and non-transitory computer-readable medium described herein, the first TMSI and the second TMSI indicate one or more paging offset values associated with the first and second set of paging occasions.

Some examples of the method, apparatuses, and non-transitory computer-readable medium described herein may further include operations, features, means, or instructions for receiving the one or more SRSs over the set of SRS resources in accordance with the first periodicity and receiving the one or more paging messages in accordance with the third periodicity, where the one or more paging messages may be non-colliding with the received one or more SRSs.

In some examples of the method, apparatuses, and non-transitory computer-readable medium described herein, the registration request message may be a type two registration request message indicating an update to an existing registration of the second SIM.

Some examples of the method, apparatuses, and non-transitory computer-readable medium described herein may further include operations, features, means, or instructions for determining a threshold number of registration request messages for transmission over a time interval and transmitting a set of registration request messages during the time interval based on the collision, where a number of the set of registration request messages may be less than or equal to the threshold number.

In some examples of the method, apparatuses, and non-transitory computer-readable medium described herein, the second registration message includes a registration accept message.

In some examples of the method, apparatuses, and non-transitory computer-readable medium described herein, the first SIM includes a DDS of the UE, and the second SIM includes a nDDS service of the UE.

In some examples of the method, apparatuses, and non-transitory computer-readable medium described herein, the first SIM corresponds to a connected state of the UE, and the second SIM corresponds to an idle state of the UE.

DETAILED DESCRIPTION

Some wireless communications systems may support signaling for user equipment (UE) that are equipped with more than one subscriber or subscriber identity module (SIM). Such devices may be referred to as multi-SIM devices (e.g., multi-SIM UEs) which may communicate via multiple different services to provide high throughput and enhanced device capability. For example, a first SIM of a UE (such as a dedicated data subscription (DDS)) SIM may be configured to periodically receive a set of sounding reference signals (SRS) during SRS occasions of an SRS interval, and a second SIM of the UE (such as a non-dedicated data subscription (nDDS) SIM) may be configured to periodically receive paging messages during a set of paging occasions of a paging interval.

In some cases, however, one or more SRS occasions may overlap in time with one or more paging occasions, causing a paging collision. For example, resources for receiving one or more SRSs using the first SIM may collide in time with resources for receiving one or more paging occasions using a second SIM, and the UE may suspend or release SRS signaling in order to receive the paging messages. Such SRS suspension may degrade downlink throughput for the UE or otherwise impact the signaling performance of the UE.

To account for SRS and paging collisions based on the multi-SIM capabilities of the UE, the UE may implement a number of different techniques to reduce the likelihood of collisions between services. In some implementations, the UE that has an active registration with the network may identify a collision between SRS resources and paging occasions occurring on different SIMs of the UE. Based on the identified collision, the UE may transmit a registration update request message to the network to request an updated registration. In response to the registration update request message, the UE may receive a registration response message, or a registration accept message which includes a new or updated temporary mobile subscriber identity (TMSI), which the UE may use to calculate a new periodicity for paging occasions on the second SIM. The new periodicity may indicate paging occasions that are non-overlapping with SRS occasions, which may reduce the likelihood of SRS suspension due to collisions.

Aspects of the disclosure are initially described in the context of wireless communications systems. Aspects of the disclosure are further illustrated by and described with reference to apparatus diagrams, system diagrams, signaling configurations, a process flow, and flowcharts that relate to methods to avoid SRS suspension due to multi-subscriber paging occasion collision.

Figure 1:
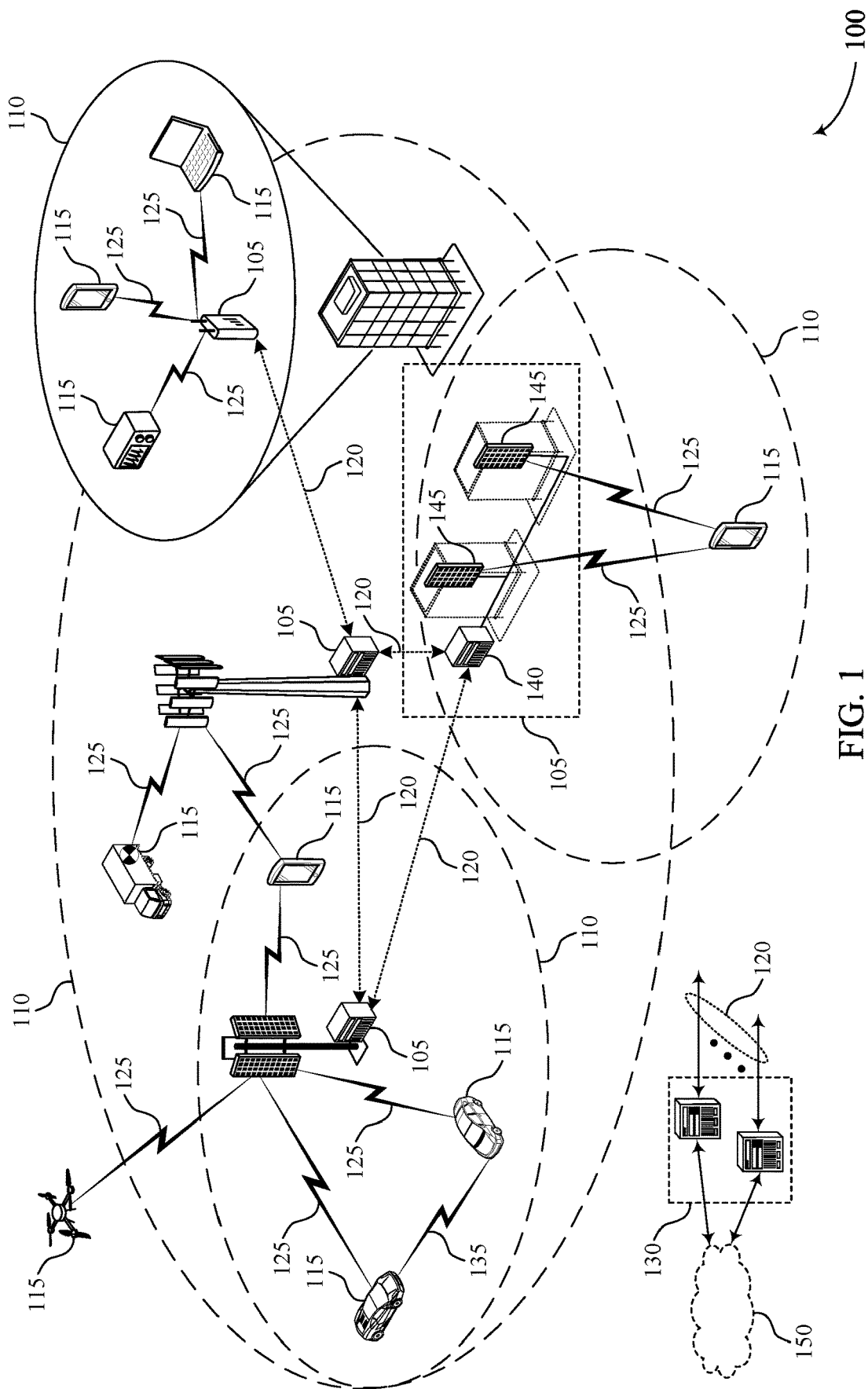
FIG. 1 illustrates an example of a wireless communications system that supports methods to avoid sounding reference signal (SRS) suspension due to multi-subscriber paging occasion collision in accordance with aspects of the present disclosure.

FIG. 1 illustrates an example of a wireless communications system 100 that supports methods to avoid SRS suspension due to multi-subscriber paging occasion collision in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, a UE 115 may be a multi-SIM UE which may communicate via multiple different services with other devices in the wireless communications network 100. For example, a first SIM of UE 115 may be configured to receive SRS signaling via a set of SRS occasions of an SRS interval, and a second SIM of the UE 115 may be configured to periodically receive paging messages during a set of paging occasions of a paging interval. In some cases, however, one or more SRS occasions may overlap in time with one or more paging occasions, causing a paging collision which may cause the UE 115 to suspend SRS signaling thus impacting downlink throughput for the UE 115.

To account for SRS and paging collisions based on the multi-SIM capabilities of the UE 115, upon identifying a collision between SRS resources and paging occasions occurring on different SIMs of the UE 115 the UE 115 may transmit a registration update request message to a base station 105 to request an updated registration. In response to the registration update request message, the UE 115 may receive a registration accept message which includes a new or updated TMSI, which the UE 115 may use to calculate a new periodicity for paging occasions on the second SIM that are non-overlapping with SRS occasions.

Figure 2:
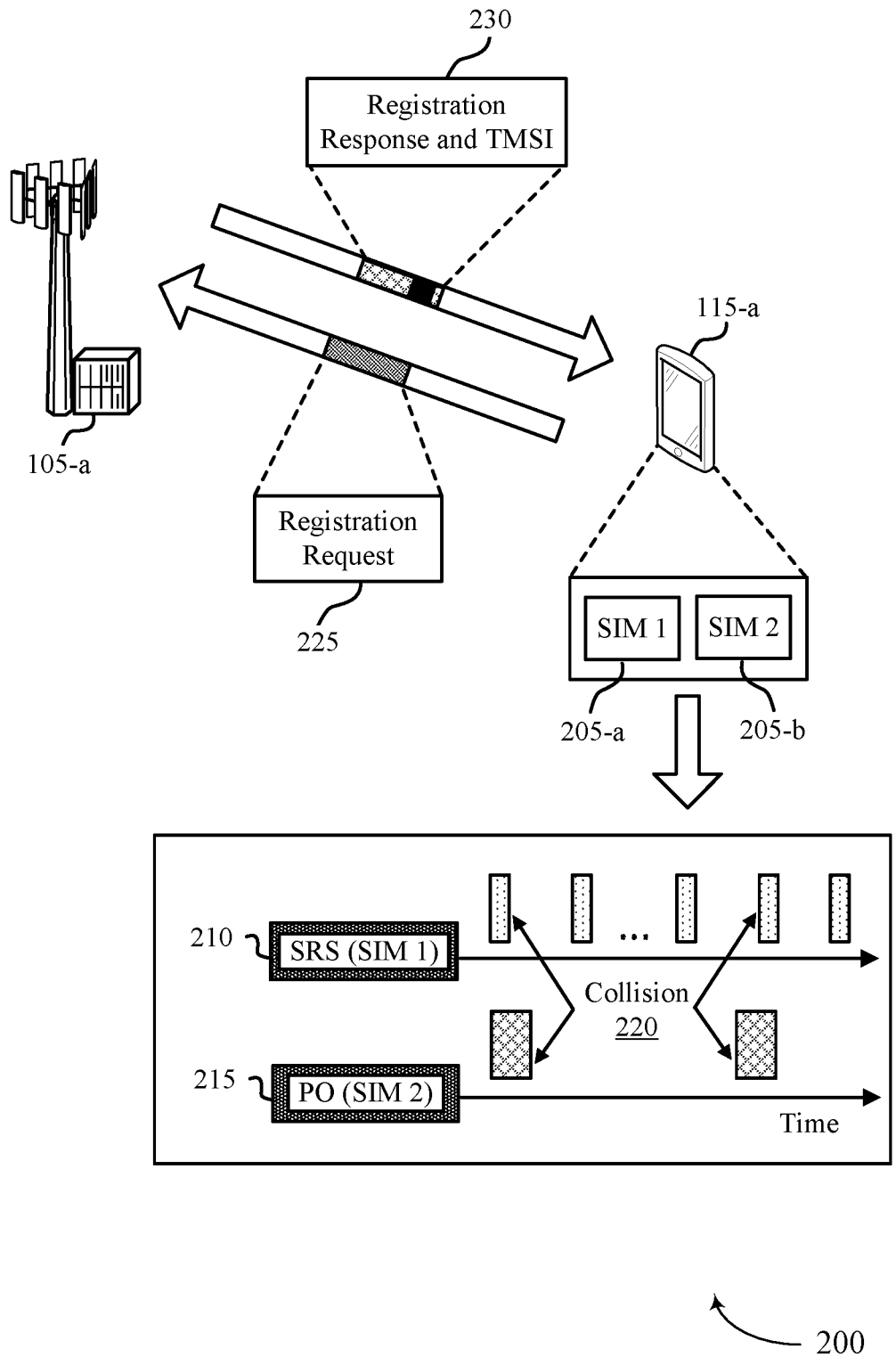
FIG. 2 illustrates an example of a wireless communications system that supports methods to avoid SRS suspension due to multi-subscriber paging occasion collision in accordance with aspects of the present disclosure.

FIG. 2 illustrates an example of a wireless communications system 200 that supports methods to avoid SRS suspension due to multi-subscriber paging occasion collision in accordance with aspects of the present disclosure. For example, wireless communications system 200 may support communications between a base station 105-*a* and a UE 115-*a*, which may be corresponding examples of base stations 105 and UE 115 described with reference to FIG. 1.

Some UEs (e.g., 5G+5G Multi-SIM (MUSIM) UEs) such as the UE 115-*a* may be equipped with two or more SIMs (e.g., SIM 205-*a* and SIM 205-*b*) which may allow the UE to communicate via multiple different services and provide enhanced device capability. For example, a first SIM 205-*a* (such as a DDS) SIM may be configured to periodically receive a set of SRSs 210 according to an SRS interval (for example, every 10 to 160 milliseconds), and a second SIM 205-*b* (such as a nDDS may be configured to periodically receive a set of paging occasions 215 according to a paging interval (for example, every 320 milliseconds). In such cases, the UE 115-*a* actively communicates with a first system (e.g., via SRS communications) using the first SIM 205-*a* while periodically monitoring another system (e.g., synchronizing, reading a paging channel or other system information, and performing measurements in an idle or inactive state) using the second SIM 205-*b*.

In some cases, the UE 115-*a* may be in a connected state (e.g., RRC connected) with the base station 105-*a*, and may communicate SRS signaling 210 using multiple antennas (e.g., up to four receiving or transmitting antennas) on the first SIM 205-*a*. The UE 115-*a* may then receive a paging message using the second SIM 205-*b* while actively communicating with the first SIM 205-*a*, and the UE 115-*a* may determine whether to respond to this paging or not. In cases that the UE 115-*a* responds to the paging on the second SIM 205-*b*, the UE 115-*a* may stop or suspend the SRS for the first SIM 205-*a*.

In some cases, the UE 115-*a* may experience paging collisions which may result in missed paging messages. For example, resources for receiving one or more SRSs using the first SIM 205-*a* and the resources for receiving one or more paging occasions using a second SIM 205-*b* may collide in time (e.g., at the collision 220), which may reduce throughput and may affect user experience for the multi-SIM UE 115-*a*. In some other cases, if the first and second SIMs 205 may share one or more radio frequency front end (RFFE) components, and the DDS SRS occasion collides with the nDDS paging occasion, the SRS of the first SIM may be suspended during then during the paging of the second SIM (e.g., for N41+N41, N41+N1/2/3 multi-SIM band combinations). For time-division duplexing (TDD) implementations of wireless communications system 200, the base station 105-*a* may estimate rank and precoding parameters from the SRS occasions and may apply these parameters to the downlink channel. When SRS is suspended, the base station 105-*a* may modify the number of layers associated with the downlink channel, the modulation and coding scheme (MCS) or may modify the downlink channel precoding (e.g., resulting in PDSCH BLER). Such modifications as a result of SRS suspension may degrade downlink throughput for the multi-SIM UE 115-*a* (e.g., relative to throughput of a single SIM UE).

The UE 115-*a* may implement a number of different techniques to reduce the likelihood of collisions between services of a multi-SIM UE, and to account for the possible collisions and SRS suspension. In some implementations, the UE 115-*a* may identify a collision 220 between SRS resources 210 and paging occasions 215 occurring on different SIMs 205 of the UE 115-*a* (e.g., a collision between a DDS subscriber for SRS and a nDDS subscriber for paging) using UE software, received signaling, or other methods. Based on the identified collision, the UE 115-*a* may transmit a registration update request message 225 to the base station 105-*a* to request an updated registration with the network. For example, the UE 115-*a* may transmit the registration request message 225 in response to the identified collision 220, and the registration request may include a number of parameters including a parameter requesting an updated registration (e.g., _5gs_reg_type=2 (0x2) (mob reg updating)). The UE 115-*a* may receive a registration response or a registration accept message 230 from the base station 105-*a* which includes a new or updated TMSI, which the UE 115-*a* can use to calculate a new periodicity for receiving paging messages (e.g., paging occasions) on the second SIM 205-*b*. The UE 115-*a* may use the updated TMSI to calculate a new paging periodicity and offset which may shift the paging occasions such that they are non-colliding with SRS occasions. Such updated paging occasions may increase downlink throughput and overall device performance for the UE 115-*a*.

In some other examples, the DDS SRS collision on the first SIM 205-*a* with the nDDS paging on the second SIM 205-*b* may occur more than once (for example, after a handover of the UE), even after the UE 115-*a* receives and implements the updated registration and TMSI. In such cases, the UE 115-*a* may transmit an additional registration request according to an established periodicity for sending registration requests. For example, the UE 115-*a* may determine a number of registration requests it may transmit per duration of time, and may transmit up to that number of registration requests based on additional identified collisions.

Figure 3:
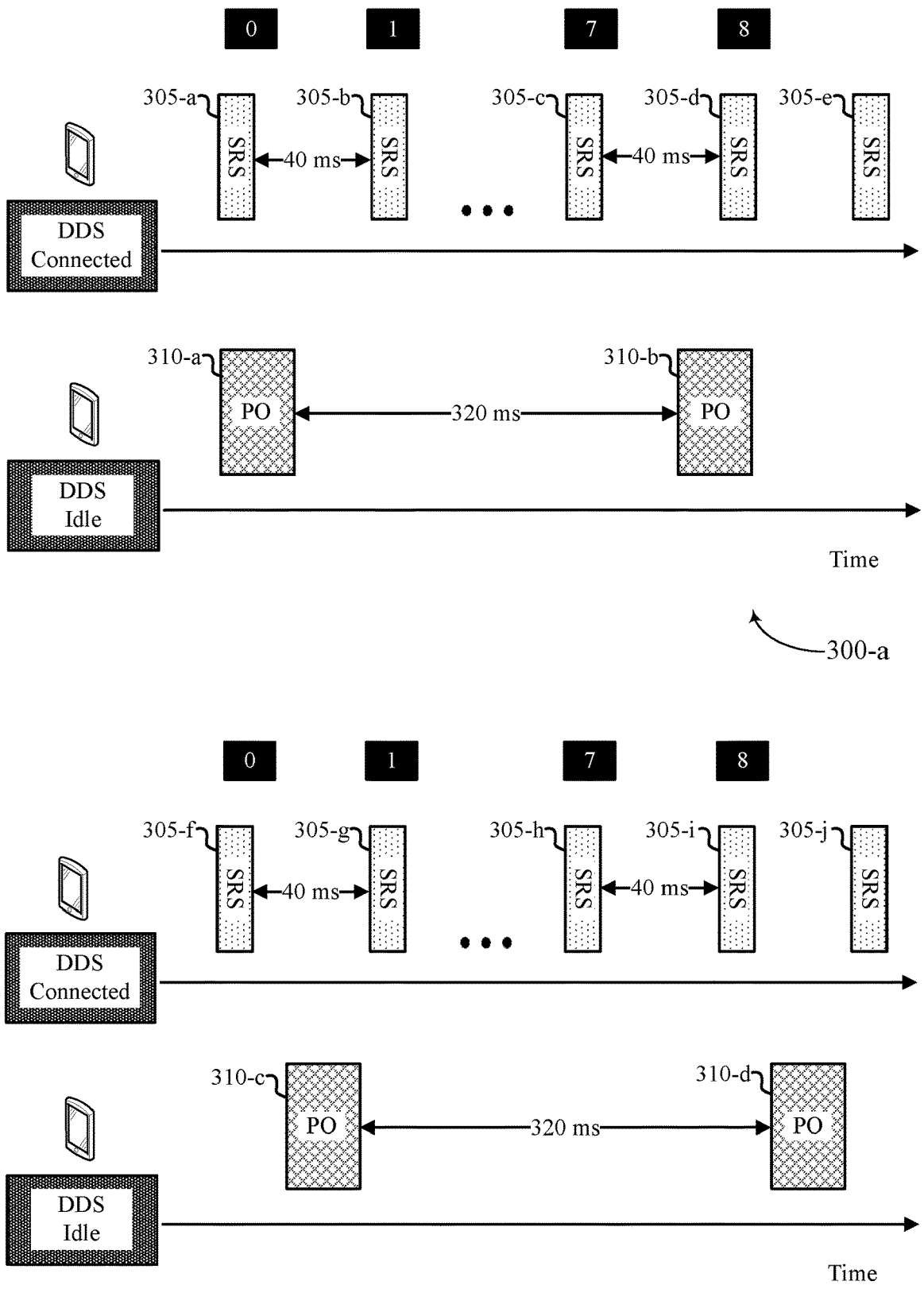
FIG. 3 illustrates example signaling configurations that support methods to avoid SRS suspension due to multi-subscriber paging occasion collision in accordance with aspects of the present disclosure.

FIG. 3 illustrates an example of signaling configurations 300-*a* and 300-*b* that support methods to avoid SRS suspension due to multi-subscriber paging occasion collision in accordance with aspects of the present disclosure. For example, signaling configurations 300-*a* and 300-*b* may be implemented at or by a base station, a UE, or both, and may support signaling between devices described with reference to FIGS. 1 and 2.

In the example of signaling configuration 300-*a*, a multi-SIM UE may communicate with a base station using a first SIM while in a connected state (e.g., a DDS NR connected state), and may receive a number of SRS transmissions during SRS occasions 305-*a*, 305-*b*, 305-*c*, 305-*d*, and 305-*e*. In signaling configuration 300-*a*, each SRS occasion 305 may be separated by a 40 ms interval such that the UE receives an SRS transmission with a periodicity of 40 ms. The UE may receive the SRS configuration via RRC or other control signaling. The UE may also support communications on a second SIM in an idle state (e.g., a DDS NR idle state), and may receive (or be scheduled to receive) a number of paging messages during paging occasions 310-*a* and 310-*b*. In signaling configuration 300-*a*, each paging occasion 310 may be separated by a 320 ms interval such that the UE receives paging message with a periodicity of 320 ms. In some cases, the UE may stop or suspend the SRS transmissions on the DDS connected SIM in order to respond to a paging message on paging occasion 310-*a*, paging occasion 310-*b*, or both.

In some cases, one or more paging occasions for the nDDS idle SIM may overlap in time with one or more SRS occasions of the DDS connected SIM. For example, the paging occasion 310-*a* may overlap with the SRS occasion 305-*a*, and the paging occasion 310-*b* may overlap with the SRS occasion 305-*d*. In such examples, the UE may suspend receiving the SRS signaling to receive the paging, which may reduce system throughput.

To account for instances of overlap, the UE may implement a number of techniques to account for collisions between SRS and paging occasions on different SIMs of the UE. For example, the UE may identify the collision between the SRS occasions and the paging occasions in signaling configuration 300-*a*, and may transmit a registration update request message to the network to request an updated registration including a new or updated TMSI. The UE may then use the updated TMSI in a registration response message to calculate a new periodicity for receiving paging messages (e.g., paging occasions).

For example, in signaling configuration 300-*b*, the UE may use the TMSI to calculate paging occasions 310-*c* and 310-*d* that are non-overlapping with the SRS occasions 305-*f*, 305-*g*, 305-*h*, 305-*i*, and 305-*j*. Such updated paging occasions may increase downlink throughput and overall device performance for the UE.

Figure 4:
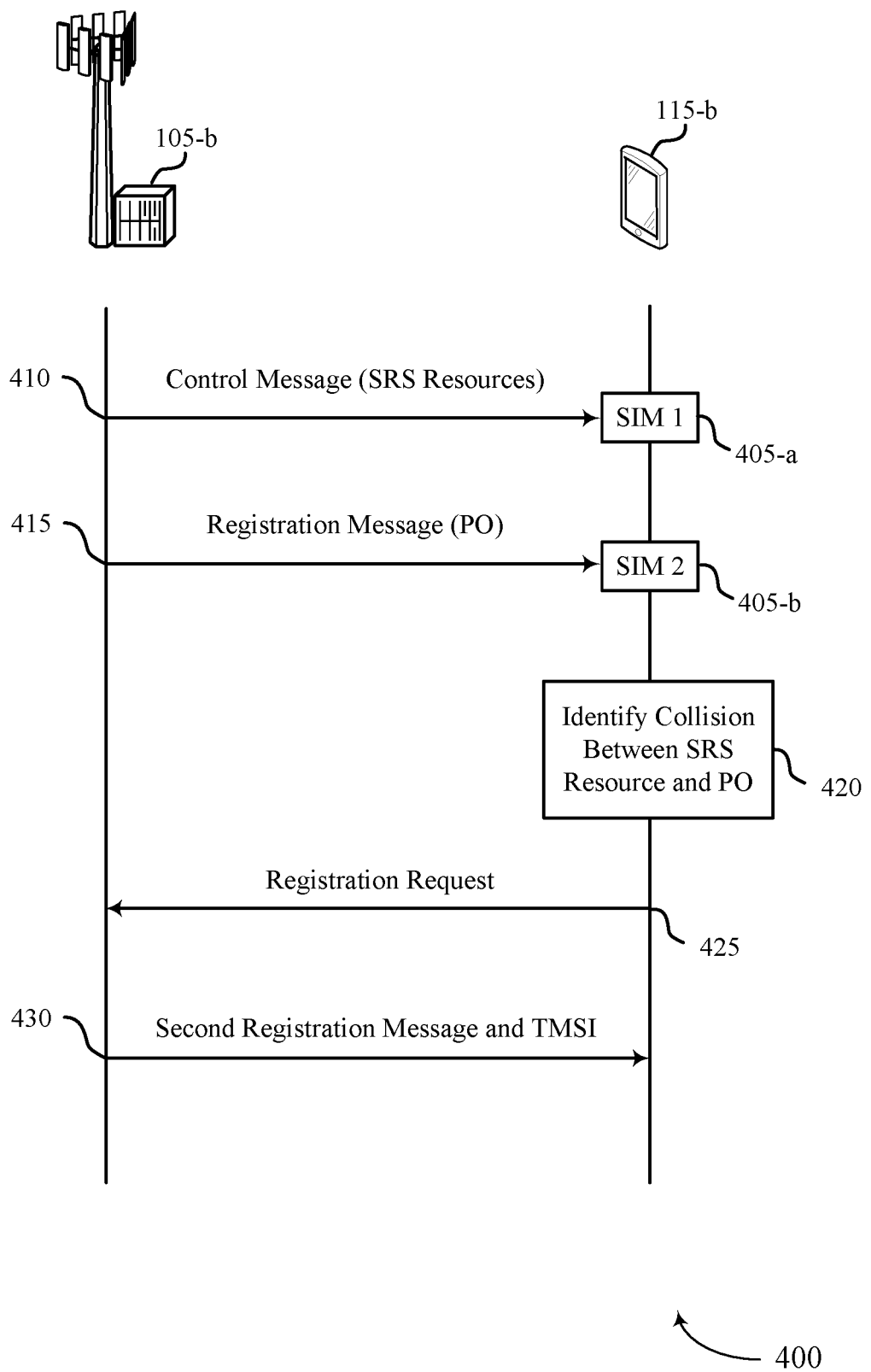
FIG. 4 illustrates an example of a process flow that supports methods to avoid SRS suspension due to multi-subscriber paging occasion collision in accordance with aspects of the present disclosure.

FIG. 4 illustrates an example of a process flow 400 that supports methods to avoid SRS suspension due to multi-subscriber paging occasion collision in accordance with aspects of the present disclosure. The process flow 400 may implement aspects of wireless communications systems 100 through 300, or may be implemented by aspects of the wireless communications system 100 through 300. For example, the process flow 400 may illustrate operations between a UE 115-*b*, and base station 105-*b*, which may be examples of corresponding devices described with reference to FIGS. 1 and 2. In the following description of the process flow 400, the operations between the devices may be transmitted in a different order than the example order shown, or the operations may be performed in different orders or at different times or by different devices. Additionally or alternatively, some operations may also be omitted from the process flow 400, and other operations may be added to the process flow 400.

In some examples of process flow 400, the UE 115-*b* may be an example of a multi-SIM UE. For example, the UE 115-*b* may include a first SIM 405-*a* which may support active mode SRS communications with the base station 105-*b*, and a second SIM 405-*b*, which may support idle mode paging communications. In some examples, the first SIM 405-*a* is a DDS SIM, and the second SIM 405-*b* is a nDDS SIM.

At 410, the base station 105-*b* may transmit, and the UE 115-*b* may receive (e.g., at the first SIM 405-*a*), a control message indicating a set of SRS resources for one or more SRSs in accordance with a first periodicity.

At 415, the base station 105-*b* may transmit, and the UE 115-*b* may receive (e.g., at the second SIM 405-*b*), a registration message that includes a first parameter (e.g., a first TMSI) that indicates a first set of paging occasions for one or more paging messages in accordance with a second periodicity.

At 420, the UE 115-*b* may identify a collision in time between a SRS signal resource of the set of SRSs and a paging occasion of the set of paging occasions, and at 425, the UE 115-*b* may transmit a registration request message based on the identified collision. In some examples, the registration request message is a type two registration request message indicating an update to an existing registration of the SIM 405-*b*.

At 430, the base station 105-*b* may transmit, and the UE 115-*b* may receive, a second registration message in response to the registration request message. In some examples, the second registration message includes a second parameter (e.g., a second TMSI or an updated TMSI) that indicates a second set of paging occasions for the one or more paging messages having a third periodicity. In some examples, the second registration message is a registration accept message.

In some examples, the UE 115-*b* may determine or calculate the first set of paging occasions using the first TMSI and may determine the second set of paging occasions using the second TMSI. The UE 115-*b* may determine the third periodicity based on the second TMSI associated with the second set of paging occasions. Additionally or alternatively, the UE 115-*b* may determine one or more paging offset values associated with the first and second set of paging occasions based on the first and second TMSI.

The UE 115-*b* may receive SRSs over the set of SRS resources with the first periodicity, and based on the second TMSI, may receive one or more paging messages that are non-overlapping or non-colliding with the SRSs.

In some cases, the UE 115-*b* may determine a threshold number of registration request messages that it may transmit over a time interval, and the UE 115-*b* may transmit a number of registration request messages during the time interval that is less than or equal to the threshold number.

Figure 5:
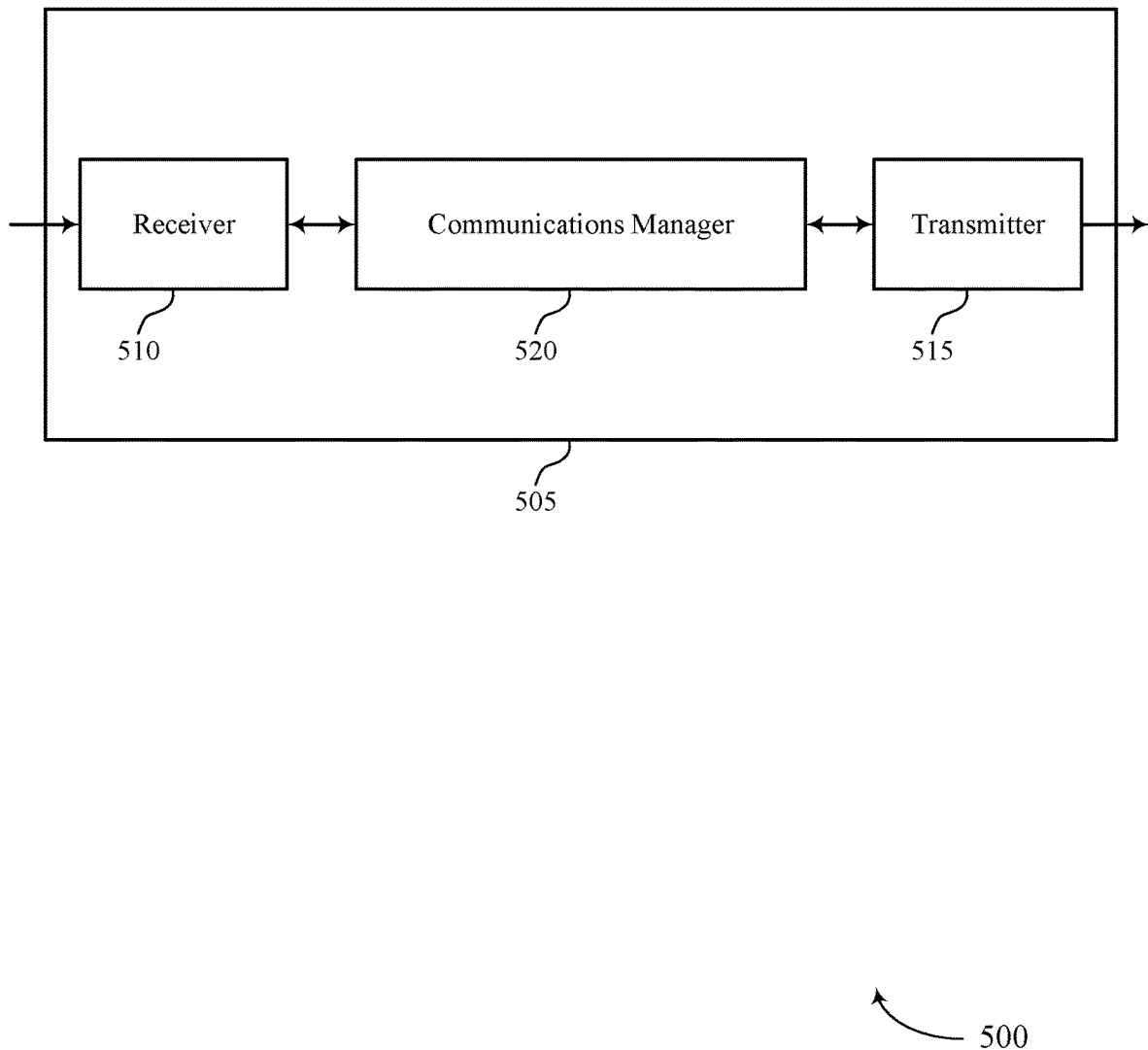
FIGS. 5 and 6 show block diagrams of devices that support methods to avoid SRS suspension due to multi-subscriber paging occasion collision in accordance with aspects of the present disclosure.

FIG. 5 shows a block diagram 500 of a device 505 that supports methods to avoid SRS suspension due to multi-subscriber paging occasion collision in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to methods to avoid SRS suspension due to multi-subscriber paging occasion collision). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to methods to avoid SRS suspension due to multi-subscriber paging occasion collision). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of methods to avoid SRS suspension due to multi-subscriber paging occasion collision as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, by a first SIM of the UE, a control message indicating a set of SRS resources for one or more SRSs in accordance with a first periodicity. The communications manager 520 may be configured as or otherwise support a means for receiving, at a second SIM of the UE, a registration message including a first parameter that indicates a first set of paging occasions for one or more paging messages in accordance with a second periodicity. The communications manager 520 may be configured as or otherwise support a means for transmitting, to a base station, a registration request message based on a collision in time between a SRS resource of the set of SRS resources and a paging occasion of the set of paging occasions. The communications manager 520 may be configured as or otherwise support a means for receiving, from the base station, a second registration message in response to the registration request message, the second registration message including a second parameter that indicates a second set of paging occasions for the one or more paging messages in accordance with a third periodicity.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced instances of SRS suspension, and more efficient utilization of communication resources.

Figure 6:
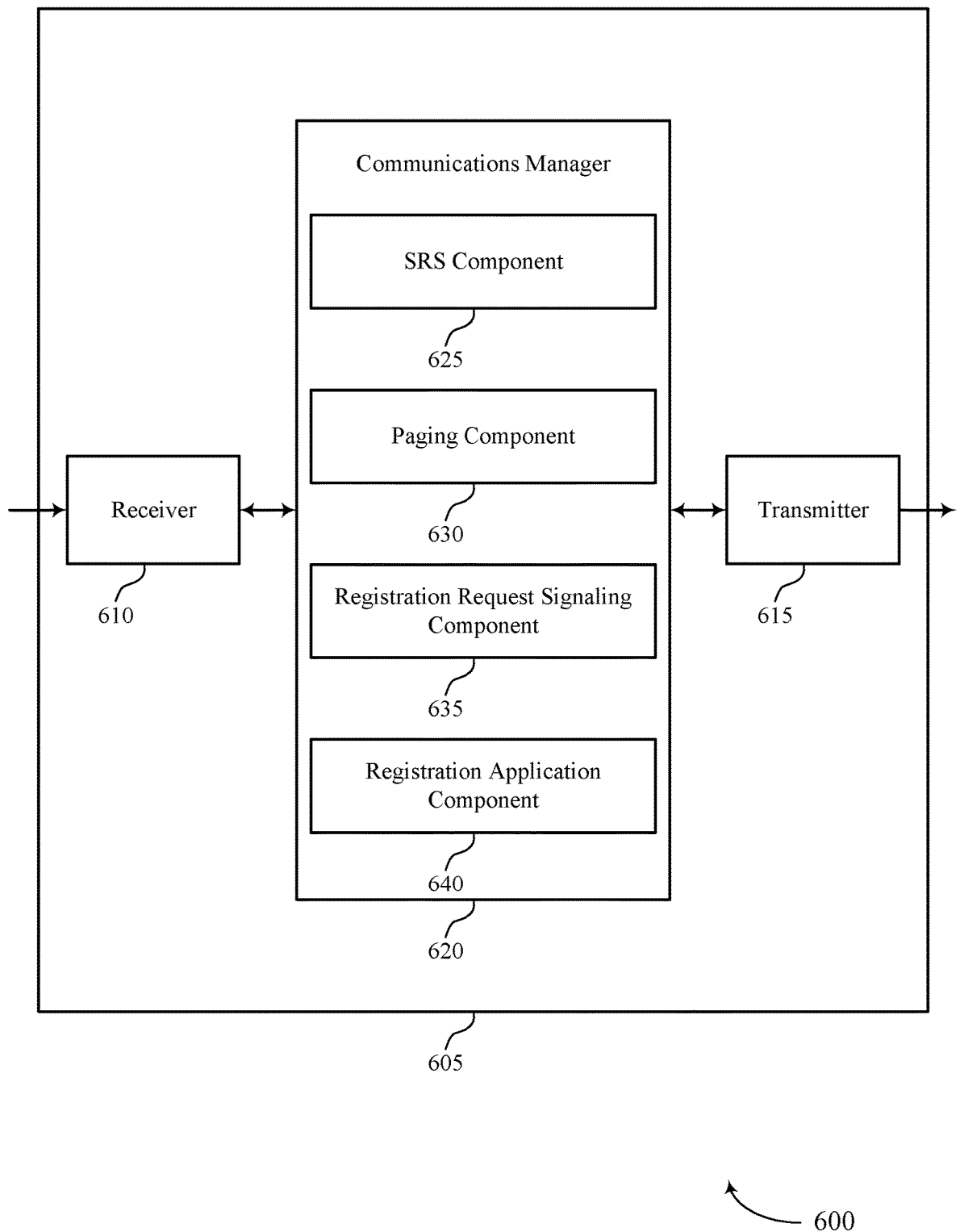

FIG. 6 shows a block diagram 600 of a device 605 that supports methods to avoid SRS suspension due to multi-subscriber paging occasion collision in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to methods to avoid SRS suspension due to multi-subscriber paging occasion collision). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to methods to avoid SRS suspension due to multi-subscriber paging occasion collision). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of methods to avoid SRS suspension due to multi-subscriber paging occasion collision as described herein. For example, the communications manager 620 may include an SRS component 625, a paging component 630, a registration request signaling component 635, a registration application component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The SRS component 625 may be configured as or otherwise support a means for receiving, by a first SIM of the UE, a control message indicating a set of SRS resources for one or more SRSs in accordance with a first periodicity. The paging component 630 may be configured as or otherwise support a means for receiving, at a second SIM of the UE, a registration message including a first parameter that indicates a first set of paging occasions for one or more paging messages in accordance with a second periodicity. The registration request signaling component 635 may be configured as or otherwise support a means for transmitting, to a base station, a registration request message based on a collision in time between a SRS resource of the set of SRS resources and a paging occasion of the set of paging occasions. The registration application component 640 may be configured as or otherwise support a means for receiving, from the base station, a second registration message in response to the registration request message, the second registration message including a second parameter that indicates a second set of paging occasions for the one or more paging messages in accordance with a third periodicity.

Figure 7:
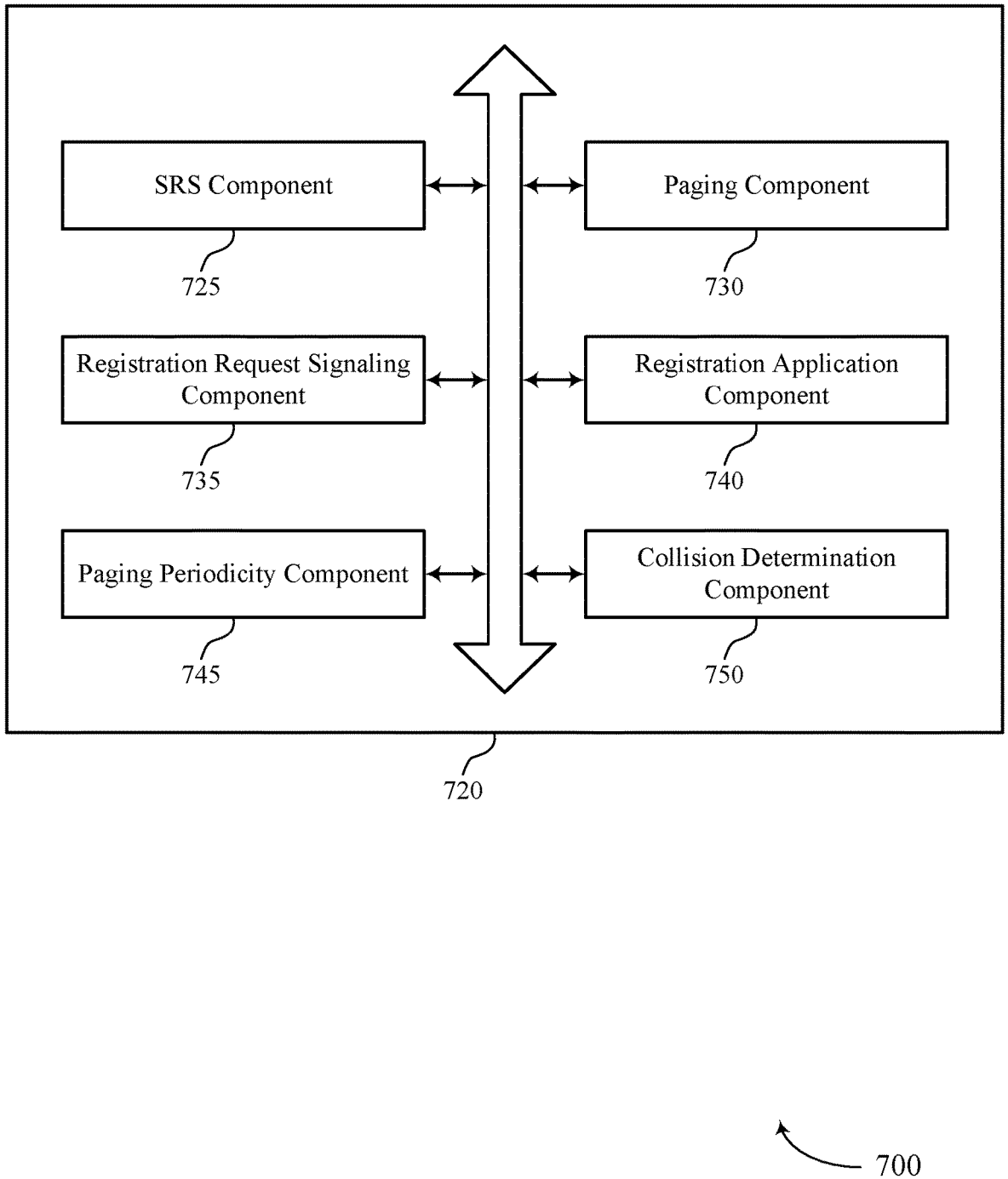
FIG. 7 shows a block diagram of a communications manager that supports methods to avoid SRS suspension due to multi-subscriber paging occasion collision in accordance with aspects of the present disclosure.

FIG. 7 shows a block diagram 700 of a communications manager 720 that supports methods to avoid SRS suspension due to multi-subscriber paging occasion collision in accordance with aspects of the present disclosure. The communications manager 720 may be an example of aspects of a communications manager 520, a communications manager 620, or both, as described herein. The communications manager 720, or various components thereof, may be an example of means for performing various aspects of methods to avoid SRS suspension due to multi-subscriber paging occasion collision as described herein. For example, the communications manager 720 may include an SRS component 725, a paging component 730, a registration request signaling component 735, a registration application component 740, a paging periodicity component 745, a collision determination component 750, or any combination thereof. Each of these components may communicate, directly or indirectly, with one another (e.g., via one or more buses).

The communications manager 720 may support wireless communication at a UE in accordance with examples as disclosed herein. The SRS component 725 may be configured as or otherwise support a means for receiving, by a first SIM of the UE, a control message indicating a set of SRS resources for one or more SRSs in accordance with a first periodicity. The paging component 730 may be configured as or otherwise support a means for receiving, at a second SIM of the UE, a registration message including a first parameter that indicates a first set of paging occasions for one or more paging messages in accordance with a second periodicity. The registration request signaling component 735 may be configured as or otherwise support a means for transmitting, to a base station, a registration request message based on a collision in time between a SRS resource of the set of SRS resources and a paging occasion of the set of paging occasions. The registration application component 740 may be configured as or otherwise support a means for receiving, from the base station, a second registration message in response to the registration request message, the second registration message including a second parameter that indicates a second set of paging occasions for the one or more paging messages in accordance with a third periodicity.

In some examples, the first parameter includes a first TMSI and the second parameter includes a second TMSI, and the paging periodicity component 745 may be configured as or otherwise support a means for determining the first and second set of paging occasions for the one or more paging messages based on the respective first and second temporary mobile subscriber identities. In some examples, the first parameter includes a first TMSI and the second parameter includes a second TMSI, and the paging periodicity component 745 may be configured as or otherwise support a means for determining the third periodicity based on the second TMSI associated with the second set of paging occasions.

In some examples, the first TMSI and the second TMSI indicate one or more paging offset values associated with the first and second set of paging occasions.

In some examples, the SRS component 725 may be configured as or otherwise support a means for receiving the one or more SRSs over the set of SRS resources in accordance with the first periodicity. In some examples, the collision determination component 750 may be configured as or otherwise support a means for receiving the one or more paging messages in accordance with the third periodicity, where the one or more paging messages are non-colliding with the received one or more SRSs.

In some examples, the registration request message is a type two registration request message indicating an update to an existing registration of the second SIM.

In some examples, the registration request signaling component 735 may be configured as or otherwise support a means for determining a threshold number of registration request messages for transmission over a time interval. In some examples, the registration request signaling component 735 may be configured as or otherwise support a means for transmitting a set of registration request messages during the time interval based on the collision, where a number of the set of registration request messages is less than or equal to the threshold number.

In some examples, the second registration message includes a registration accept message.

In some examples, the first SIM includes a DDS of the UE, and the second SIM includes a nDDS service of the UE.

In some examples, the first SIM corresponds to a connected state of the UE, and the second SIM corresponds to an idle state of the UE.

Figure 8:
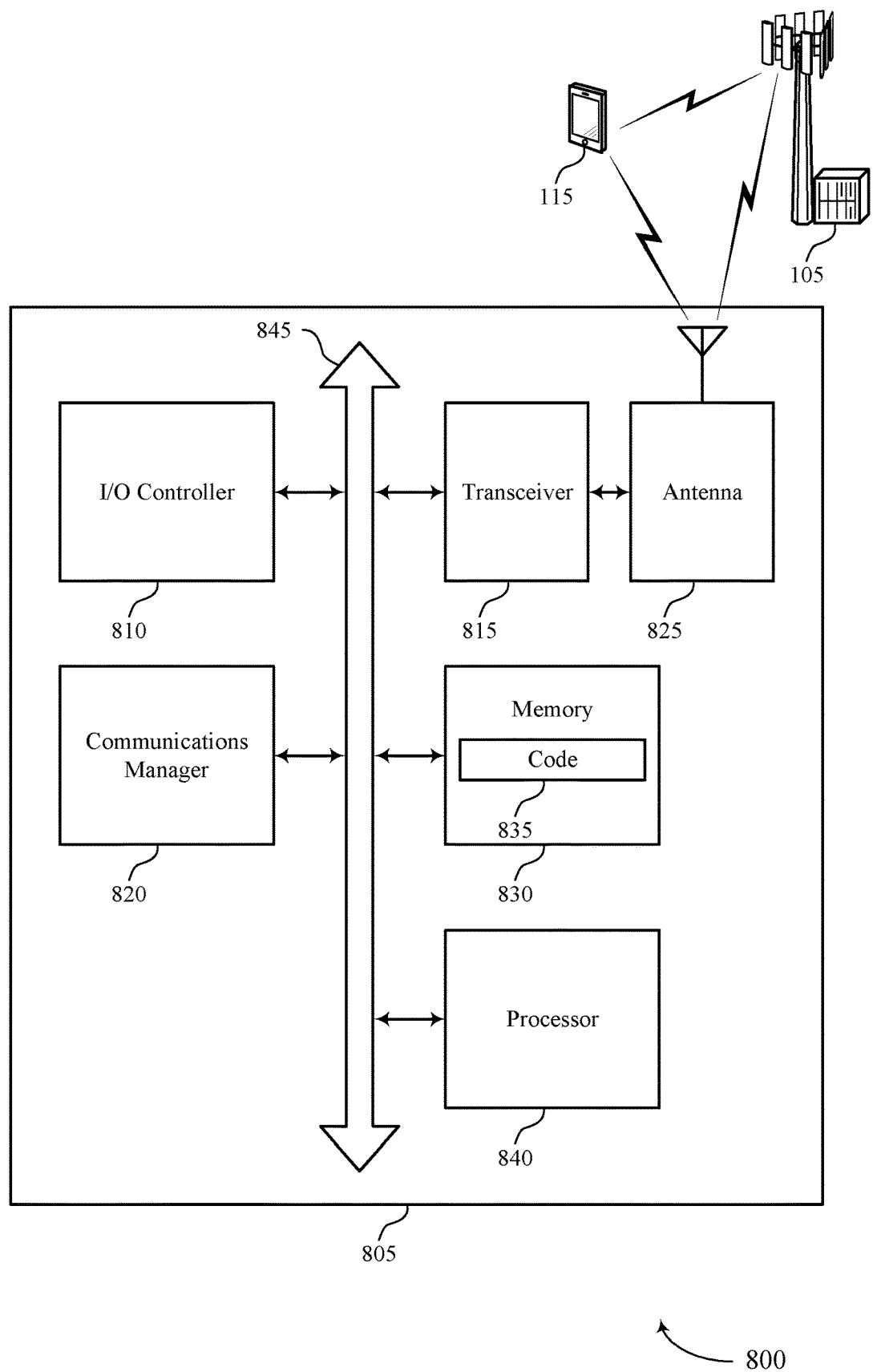
FIG. 8 shows a diagram of a system including a device that supports methods to avoid SRS suspension due to multi-subscriber paging occasion collision in accordance with aspects of the present disclosure.

FIG. 8 shows a diagram of a system 800 including a device 805 that supports methods to avoid SRS suspension due to multi-subscriber paging occasion collision in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting methods to avoid SRS suspension due to multi-subscriber paging occasion collision). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, by a first SIM of the UE, a control message indicating a set of SRS resources for one or more SRSs in accordance with a first periodicity. The communications manager 820 may be configured as or otherwise support a means for receiving, at a second SIM of the UE, a registration message including a first parameter that indicates a first set of paging occasions for one or more paging messages in accordance with a second periodicity. The communications manager 820 may be configured as or otherwise support a means for transmitting, to a base station, a registration request message based on a collision in time between a SRS resource of the set of SRS resources and a paging occasion of the set of paging occasions. The communications manager 820 may be configured as or otherwise support a means for receiving, from the base station, a second registration message in response to the registration request message, the second registration message including a second parameter that indicates a second set of paging occasions for the one or more paging messages in accordance with a third periodicity.

By including or configuring the communications manager 820 in accordance with examples as described herein, the device 805 may support techniques for improved communication reliability, reduced latency, improved user experience due to reduced SRS suspension, more efficient utilization of communication resources, and increased throughput.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of methods to avoid SRS suspension due to multi-subscriber paging occasion collision as described herein, or the processor 840 and the memory 830 may be otherwise configured to perform or support such operations.

Figure 9:
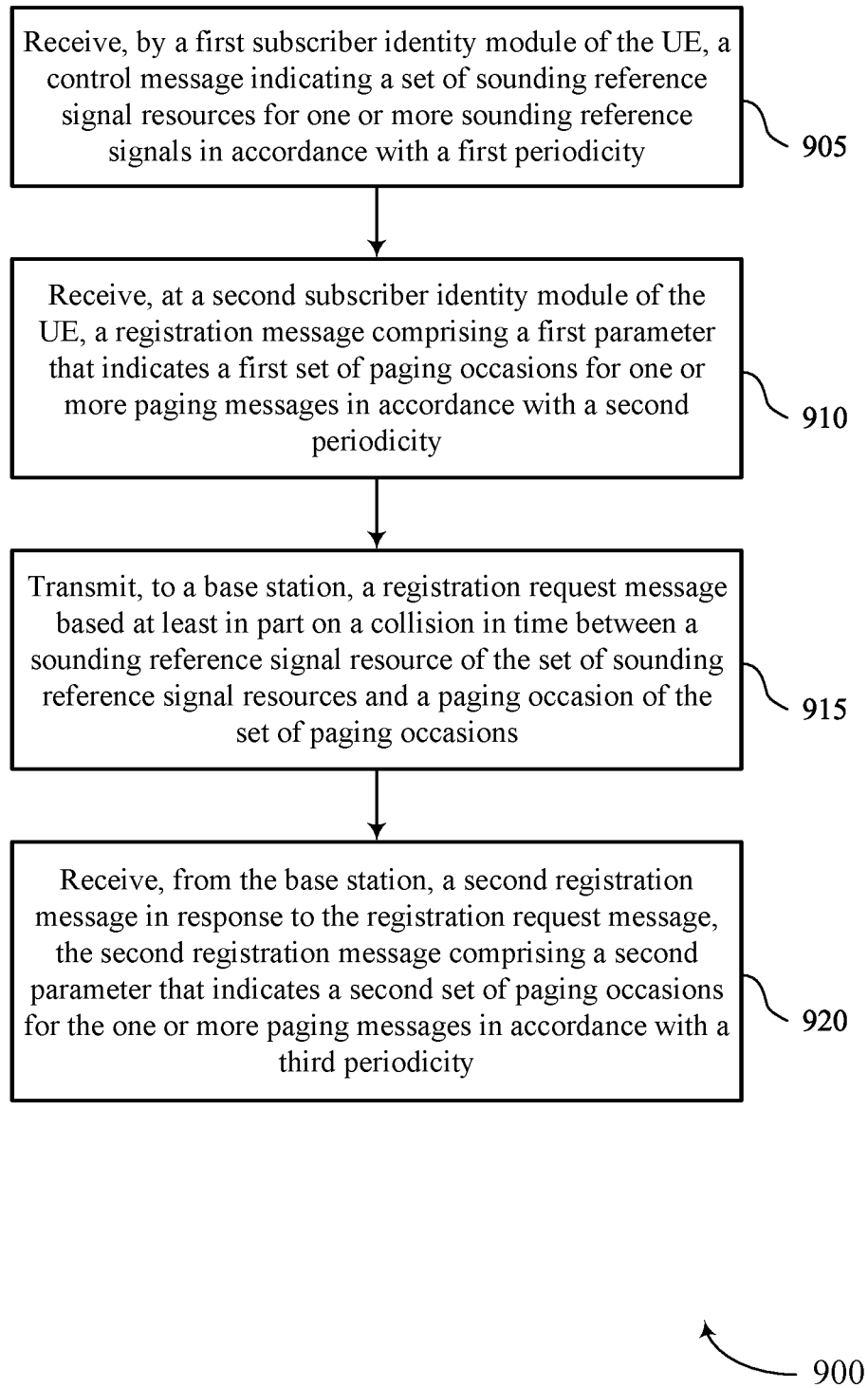
FIGS. 9 through 12 show flowcharts illustrating methods that support methods to avoid SRS suspension due to multi-subscriber paging occasion collision in accordance with aspects of the present disclosure.

FIG. 9 shows a flowchart illustrating a method 900 that supports methods to avoid SRS suspension due to multi-subscriber paging occasion collision in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, by a first SIM of the UE, a control message indicating a set of SRS resources for one or more SRSs in accordance with a first periodicity. The operations of 905 may be performed in accordance with examples as disclosed herein. In some examples, aspects of the operations of 905 may be performed by an SRS component 725 as described with reference to FIG. 7.

At 910, the method may include receiving, at a second SIM of the UE, a registration message including a first parameter that indicates a first set of paging occasions for one or more paging messages in accordance with a second periodicity. The operations of 910 may be performed in accordance with examples as disclosed herein. In some examples, aspects of the operations of 910 may be performed by a paging component 730 as described with reference to FIG. 7.

At 915, the method may include transmitting, to a base station, a registration request message based on a collision in time between a SRS resource of the set of SRS resources and a paging occasion of the set of paging occasions. The operations of 915 may be performed in accordance with examples as disclosed herein. In some examples, aspects of the operations of 915 may be performed by a registration request signaling component 735 as described with reference to FIG. 7.

At 920, the method may include receiving, from the base station, a second registration message in response to the registration request message, the second registration message including a second parameter that indicates a second set of paging occasions for the one or more paging messages in accordance with a third periodicity. The operations of 920 may be performed in accordance with examples as disclosed herein. In some examples, aspects of the operations of 920 may be performed by a registration application component 740 as described with reference to FIG. 7.

Figure 10:
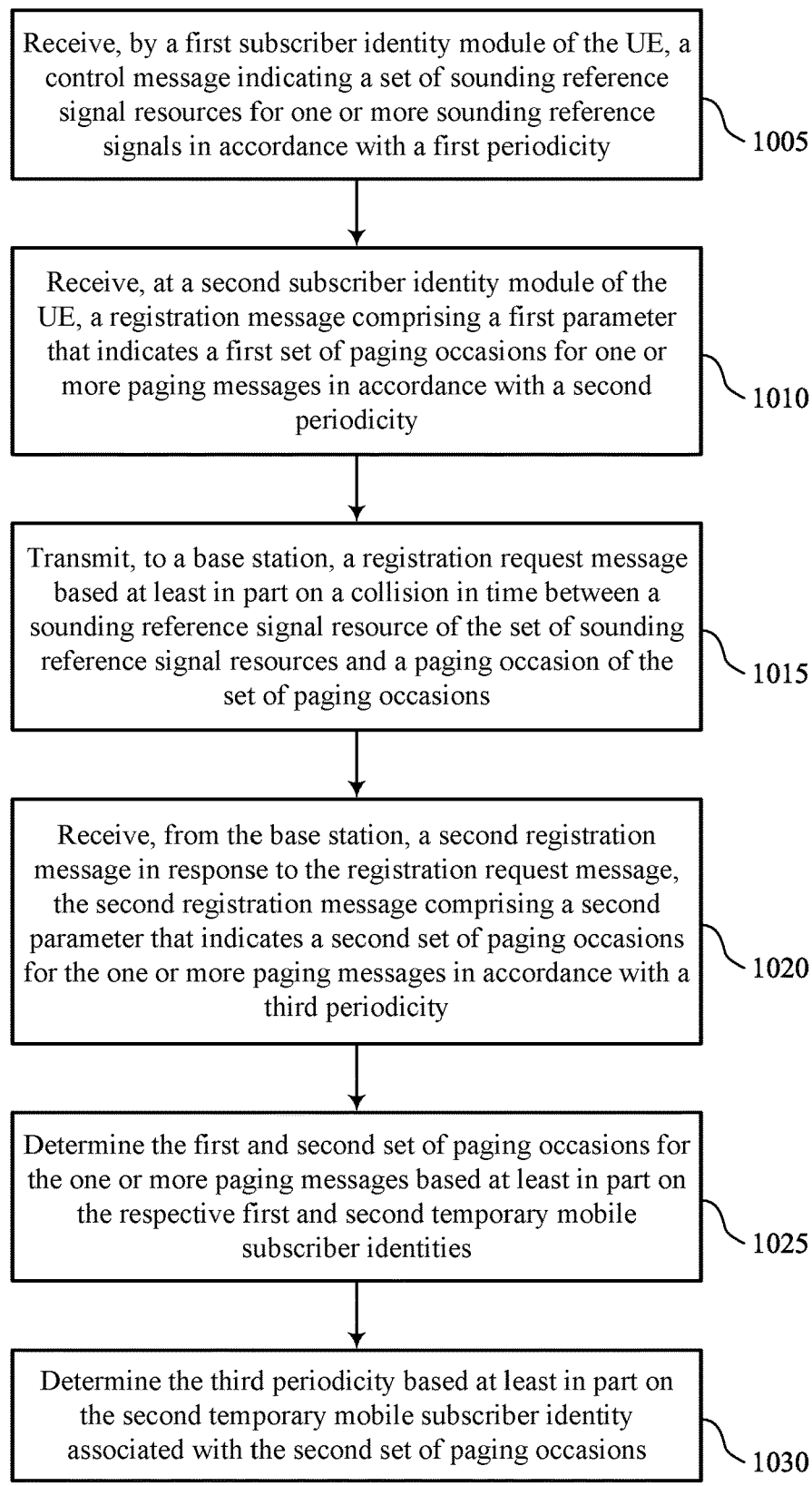

FIG. 10 shows a flowchart illustrating a method 1000 that supports methods to avoid SRS suspension due to multi-subscriber paging occasion collision in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, by a first SIM of the UE, a control message indicating a set of SRS resources for one or more SRSs in accordance with a first periodicity. The operations of 1005 may be performed in accordance with examples as disclosed herein. In some examples, aspects of the operations of 1005 may be performed by an SRS component 725 as described with reference to FIG. 7.

At 1010, the method may include receiving, at a second SIM of the UE, a registration message including a first parameter that indicates a first set of paging occasions for one or more paging messages in accordance with a second periodicity. The operations of 1010 may be performed in accordance with examples as disclosed herein. In some examples, aspects of the operations of 1010 may be performed by a paging component 730 as described with reference to FIG. 7.

At 1015, the method may include transmitting, to a base station, a registration request message based on a collision in time between a SRS resource of the set of SRS resources and a paging occasion of the set of paging occasions. The operations of 1015 may be performed in accordance with examples as disclosed herein. In some examples, aspects of the operations of 1015 may be performed by a registration request signaling component 735 as described with reference to FIG. 7.

At 1020, the method may include receiving, from the base station, a second registration message in response to the registration request message, the second registration message including a second parameter that indicates a second set of paging occasions for the one or more paging messages in accordance with a third periodicity. The operations of 1020 may be performed in accordance with examples as disclosed herein. In some examples, aspects of the operations of 1020 may be performed by a registration application component 740 as described with reference to FIG. 7.

At 1025, the method may include determining the first and second set of paging occasions for the one or more paging messages based on the respective first and second temporary mobile subscriber identities. The operations of 1025 may be performed in accordance with examples as disclosed herein. In some examples, aspects of the operations of 1025 may be performed by a paging periodicity component 745 as described with reference to FIG. 7.

At 1030, the method may include determining the third periodicity based on the second TMSI associated with the second set of paging occasions. The operations of 1030 may be performed in accordance with examples as disclosed herein. In some examples, aspects of the operations of 1030 may be performed by a paging periodicity component 745 as described with reference to FIG. 7.

Figure 11:
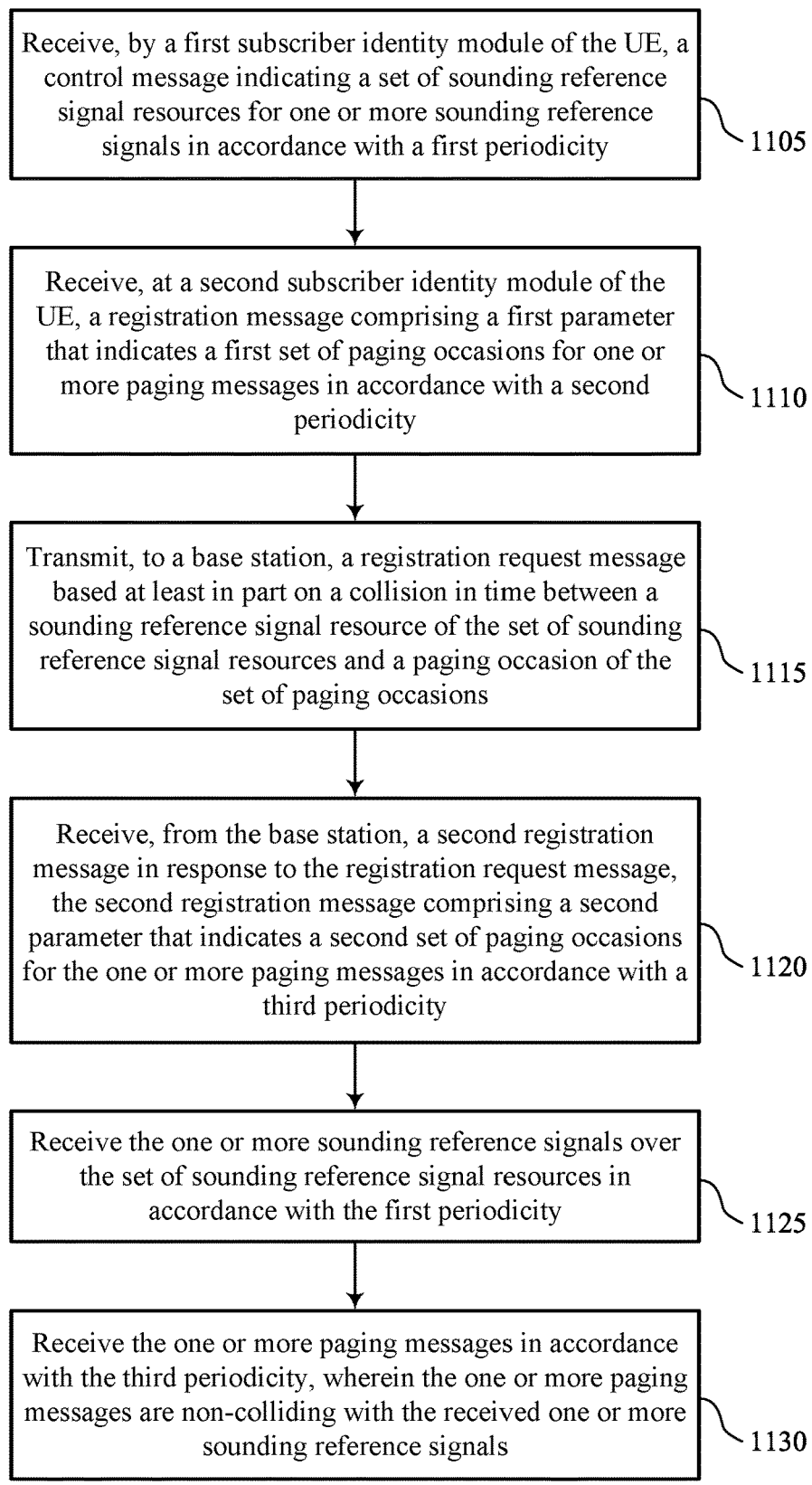

FIG. 11 shows a flowchart illustrating a method 1100 that supports methods to avoid SRS suspension due to multi-subscriber paging occasion collision in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, by a first SIM of the UE, a control message indicating a set of SRS resources for one or more SRSs in accordance with a first periodicity. The operations of 1105 may be performed in accordance with examples as disclosed herein. In some examples, aspects of the operations of 1105 may be performed by an SRS component 725 as described with reference to FIG. 7.

At 1110, the method may include receiving, at a second SIM of the UE, a registration message including a first parameter that indicates a first set of paging occasions for one or more paging messages in accordance with a second periodicity. The operations of 1110 may be performed in accordance with examples as disclosed herein. In some examples, aspects of the operations of 1110 may be performed by a paging component 730 as described with reference to FIG. 7.

At 1115, the method may include transmitting, to a base station, a registration request message based on a collision in time between a SRS resource of the set of SRS resources and a paging occasion of the set of paging occasions. The operations of 1115 may be performed in accordance with examples as disclosed herein. In some examples, aspects of the operations of 1115 may be performed by a registration request signaling component 735 as described with reference to FIG. 7.

At 1120, the method may include receiving, from the base station, a second registration message in response to the registration request message, the second registration message including a second parameter that indicates a second set of paging occasions for the one or more paging messages in accordance with a third periodicity. The operations of 1120 may be performed in accordance with examples as disclosed herein. In some examples, aspects of the operations of 1120 may be performed by a registration application component 740 as described with reference to FIG. 7.

At 1125, the method may include receiving the one or more SRSs over the set of SRS resources in accordance with the first periodicity. The operations of 1125 may be performed in accordance with examples as disclosed herein. In some examples, aspects of the operations of 1125 may be performed by an SRS component 725 as described with reference to FIG. 7.

At 1130, the method may include receiving the one or more paging messages in accordance with the third periodicity, where the one or more paging messages are non-colliding with the received one or more SRSs. The operations of 1130 may be performed in accordance with examples as disclosed herein. In some examples, aspects of the operations of 1130 may be performed by a collision determination component 750 as described with reference to FIG. 7.

Figure 12:
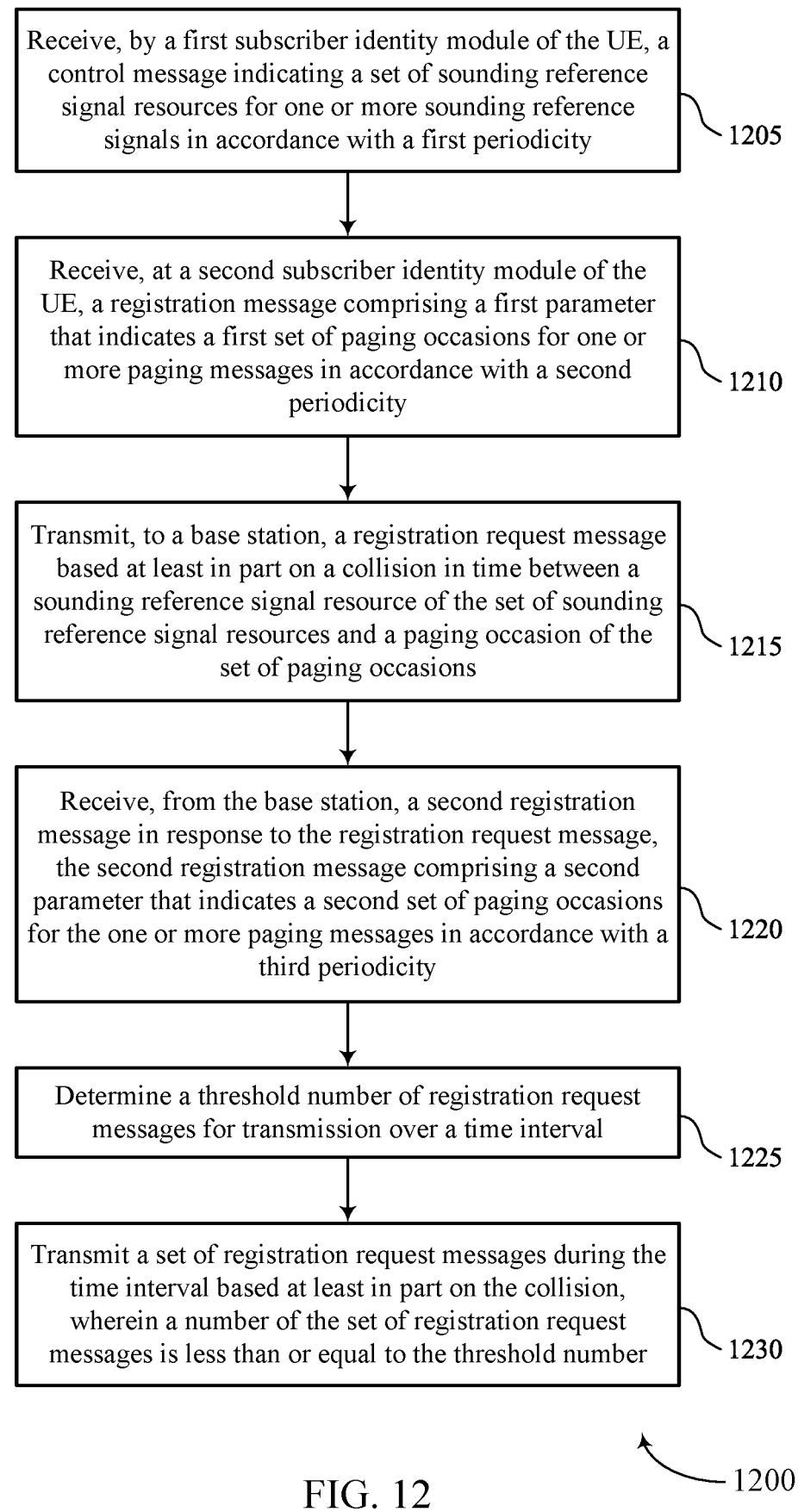

FIG. 12 shows a flowchart illustrating a method 1200 that supports methods to avoid SRS suspension due to multi-subscriber paging occasion collision in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, by a first SIM of the UE, a control message indicating a set of SRS resources for one or more SRSs in accordance with a first periodicity. The operations of 1205 may be performed in accordance with examples as disclosed herein. In some examples, aspects of the operations of 1205 may be performed by an SRS component 725 as described with reference to FIG. 7.

At 1210, the method may include receiving, at a second SIM of the UE, a registration message including a first parameter that indicates a first set of paging occasions for one or more paging messages in accordance with a second periodicity. The operations of 1210 may be performed in accordance with examples as disclosed herein. In some examples, aspects of the operations of 1210 may be performed by a paging component 730 as described with reference to FIG. 7.

At 1215, the method may include transmitting, to a base station, a registration request message based on a collision in time between a SRS resource of the set of SRS resources and a paging occasion of the set of paging occasions. The operations of 1215 may be performed in accordance with examples as disclosed herein. In some examples, aspects of the operations of 1215 may be performed by a registration request signaling component 735 as described with reference to FIG. 7.

At 1220, the method may include receiving, from the base station, a second registration message in response to the registration request message, the second registration message including a second parameter that indicates a second set of paging occasions for the one or more paging messages in accordance with a third periodicity. The operations of 1220 may be performed in accordance with examples as disclosed herein. In some examples, aspects of the operations of 1220 may be performed by a registration application component 740 as described with reference to FIG. 7.

At 1225, the method may include determining a threshold number of registration request messages for transmission over a time interval. The operations of 1225 may be performed in accordance with examples as disclosed herein. In some examples, aspects of the operations of 1225 may be performed by a registration request signaling component 735 as described with reference to FIG. 7.

At 1230, the method may include transmitting a set of registration request messages during the time interval based on the collision, where a number of the set of registration request messages is less than or equal to the threshold number. The operations of 1230 may be performed in accordance with examples as disclosed herein. In some examples, aspects of the operations of 1230 may be performed by a registration request signaling component 735 as described with reference to FIG. 7.

The following provides an overview of aspects of the present disclosure:

Aspect 1: A method for wireless communication at a UE, comprising: receiving, by a first SIM of the UE, a control message indicating a set of SRS resources for one or more SRSs in accordance with a first periodicity; receiving, at a second SIM of the UE, a registration message comprising a first parameter that indicates a first set of paging occasions for one or more paging messages in accordance with a second periodicity; transmitting, to a base station, a registration request message based at least in part on a collision in time between a SRS resource of the set of SRS resources and a paging occasion of the set of paging occasions; and receiving, from the base station, a second registration message in response to the registration request message, the second registration message comprising a second parameter that indicates a second set of paging occasions for the one or more paging messages in accordance with a third periodicity.

Aspect 2: The method of aspect 1, wherein the first parameter comprises a first TMSI and the second parameter comprises a second TMSI, the method further comprising: determining the first and second set of paging occasions for the one or more paging messages based at least in part on the respective first and second temporary mobile subscriber identities; and determining the third periodicity based at least in part on the second TMSI associated with the second set of paging occasions.

Aspect 3: The method of aspect 2, wherein the first TMSI and the second TMSI indicate one or more paging offset values associated with the first and second set of paging occasions.

Aspect 4: The method of any of aspects 1 through 3, further comprising: receiving the one or more SRSs over the set of SRS resources in accordance with the first periodicity; and receiving the one or more paging messages in accordance with the third periodicity, wherein the one or more paging messages are non-colliding with the received one or more SRSs.

Aspect 5: The method of any of aspects 1 through 4, wherein the registration request message is a type two registration request message indicating an update to an existing registration of the second SIM.

Aspect 6: The method of any of aspects 1 through 5, further comprising: determining a threshold number of registration request messages for transmission over a time interval; and transmitting a set of registration request messages during the time interval based at least in part on the collision, wherein a number of the set of registration request messages is less than or equal to the threshold number.

Aspect 7: The method of any of aspects 1 through 6, wherein the second registration message comprises a registration accept message.

Aspect 8: The method of any of aspects 1 through 7, wherein the first SIM comprises a DDS of the UE, and the second SIM comprises a nDDS of the UE.

Aspect 9: The method of any of aspects 1 through 8, wherein the first SIM corresponds to a connected state of the UE, and the second SIM corresponds to an idle state of the UE.

Aspect 10: An apparatus for wireless communication at a UE, comprising a processor; memory coupled with the processor; and instructions stored in the memory and executable by the processor to cause the apparatus to perform a method of any of aspects 1 through 9.

Aspect 11: An apparatus for wireless communication at a UE, comprising at least one means for performing a method of any of aspects 1 through 9.

Aspect 12: A non-transitory computer-readable medium storing code for wireless communication at a UE, the code comprising instructions executable by a processor to perform a method of any of aspects 1 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, by a first subscriber identity module of the UE, a control message indicating a set of sounding reference signal resources for one or more sounding reference signals in accordance with a first periodicity;
    receiving, at a second subscriber identity module of the UE, a registration message comprising a first parameter that indicates a first set of paging occasions for one or more paging messages in accordance with a second periodicity;
    transmitting, in accordance with a registration request messaging threshold, a quantity of registration request messages based at least in part on a collision in time between a sounding reference signal resource of the set of sounding reference signal resources and a paging occasion of the first set of paging occasions, wherein the quantity of registration request messages satisfies the registration request messaging threshold; and
    receiving a second registration message in response to the quantity of registration request messages, the second registration message comprising a second parameter that indicates a second set of paging occasions for the one or more paging messages in accordance with a third periodicity.

2. The method of claim 1, wherein the first parameter comprises a first temporary mobile subscriber identity and the second parameter comprises a second temporary mobile subscriber identity, the method further comprising:
    determining the first set of paging occasions and the second set of paging occasions for the one or more paging messages based at least in part on the respective first and second temporary mobile subscriber identities; and
    determining the third periodicity based at least in part on the second temporary mobile subscriber identity associated with the second set of paging occasions.

3. The method of claim 2, wherein the first temporary mobile subscriber identity and the second temporary mobile subscriber identity indicate one or more paging offset values associated with the first set of paging occasions and the second set of paging occasions.

4. The method of claim 1, further comprising:
    receiving the one or more sounding reference signals over the set of sounding reference signal resources in accordance with the first periodicity; and
    receiving the one or more paging messages in accordance with the third periodicity, wherein the one or more paging messages are non-colliding with the received one or more sounding reference signals.

5. The method of claim 1, wherein at least one registration request message of the quantity of registration request messages is a type two registration request message indicating an update to an existing registration of the second subscriber identity module.

6. The method of claim 1, further comprising:
   determining a threshold number of registration request messages for transmission over a time interval in accordance with the registration request messaging threshold; and
   transmitting a set of registration request messages during the time interval based at least in part on the collision, wherein the quantity of registration request messages is less than or equal to the threshold number of registration request messages.

7. The method of claim 1, wherein the second registration message comprises a registration accept message.

8. The method of claim 1, wherein the first subscriber identity module comprises a dedicated data subscription of the UE, and the second subscriber identity module comprises a non-dedicated data subscription service of the UE.

9. The method of claim 1, wherein the first subscriber identity module corresponds to a connected state of the UE, and the second subscriber identity module corresponds to an idle state of the UE.

10. An apparatus for wireless communication at a user equipment (UE), comprising:
   a processor;
   memory coupled with the processor; and
   instructions stored in the memory and executable by the processor to cause the apparatus to:
     receive, by a first subscriber identity module of the UE, a control message indicating a set of sounding reference signal resources for one or more sounding reference signals in accordance with a first periodicity;
     receive, at a second subscriber identity module of the UE, a registration message comprising a first parameter that indicates a first set of paging occasions for one or more paging messages in accordance with a second periodicity;
     transmit, in accordance with a registration request messaging threshold, a quantity of registration request messages based at least in part on a collision in time between a sounding reference signal resource of the set of sounding reference signal resources and a paging occasion of the first set of paging occasions, wherein the quantity of registration request messages satisfies the registration request messaging threshold; and
     receive a second registration message in response to the quantity of registration request messages, the second registration message comprising a second parameter that indicates a second set of paging occasions for the one or more paging messages in accordance with a third periodicity.

11. The apparatus of claim 10, wherein the first parameter comprises a first temporary mobile subscriber identity and the second parameter comprises a second temporary mobile subscriber identity, and the instructions are further executable by the processor to cause the apparatus to:
   determine the first set of paging occasions and the second set of paging occasions for the one or more paging messages based at least in part on the respective first and second temporary mobile subscriber identities; and
   determine the third periodicity based at least in part on the second temporary mobile subscriber identity associated with the second set of paging occasions.

12. The apparatus of claim 11, wherein the first temporary mobile subscriber identity and the second temporary mobile subscriber identity indicate one or more paging offset values associated with the first set of paging occasions and the second set of paging occasions.

13. The apparatus of claim 10, wherein the instructions are further executable by the processor to cause the apparatus to:
   receive the one or more sounding reference signals over the set of sounding reference signal resources in accordance with the first periodicity; and
   receive the one or more paging messages in accordance with the third periodicity, wherein the one or more paging messages are non-colliding with the received one or more sounding reference signals.

14. The apparatus of claim 10, wherein at least one registration request message of the quantity of registration request messages is a type two registration request message indicating an update to an existing registration of the second subscriber identity module.

15. The apparatus of claim 10, wherein the instructions are further executable by the processor to cause the apparatus to:
   determine a threshold number of registration request messages for transmission over a time interval in accordance with the registration request messaging threshold; and
   transmit a set of registration request messages during the time interval based at least in part on the collision, wherein the quantity of registration request messages is less than or equal to the threshold number of registration request messages.

16. The apparatus of claim 10, wherein the second registration message comprises a registration accept message.

17. The apparatus of claim 10, wherein the first subscriber identity module comprises a dedicated data subscription of the UE, and the second subscriber identity module comprises a non-dedicated data subscription service of the UE.

18. The apparatus of claim 10, wherein the first subscriber identity module corresponds to a connected state of the UE, and the second subscriber identity module corresponds to an idle state of the UE.

19. An apparatus for wireless communication at a user equipment (UE), comprising:
   means for receiving, by a first subscriber identity module of the UE, a control message indicating a set of sounding reference signal resources for one or more sounding reference signals in accordance with a first periodicity;
   means for receiving, at a second subscriber identity module of the UE, a registration message comprising a first parameter that indicates a first set of paging occasions for one or more paging messages in accordance with a second periodicity;
   means for transmitting, in accordance with a registration request messaging threshold, a quantity of registration request messages based at least in part on a collision in time between a sounding reference signal resource of the set of sounding reference signal resources and a paging occasion of the first set of paging occasions, wherein the quantity of registration request messages satisfies the registration request messaging threshold; and
   means for receiving a second registration message in response to the quantity of registration request messages, the second registration message comprising a second parameter that indicates a second set of paging occasions for the one or more paging messages in accordance with a third periodicity.

20. The apparatus of claim 19, wherein the first parameter comprises a first temporary mobile subscriber identity and the second parameter comprises a second temporary mobile subscriber identity, the apparatus further comprising:
  means for determining the first set of paging occasions and the second set of paging occasions for the one or more paging messages based at least in part on the respective first and second temporary mobile subscriber identities; and
  means for determining the third periodicity based at least in part on the second temporary mobile subscriber identity associated with the second set of paging occasions.

21. The apparatus of claim 20, wherein the first temporary mobile subscriber identity and the second temporary mobile subscriber identity indicate one or more paging offset values associated with the first set of paging occasions and the second set of paging occasions.

22. The apparatus of claim 19, further comprising:
  means for receiving the one or more sounding reference signals over the set of sounding reference signal resources in accordance with the first periodicity; and
  means for receiving the one or more paging messages in accordance with the third periodicity, wherein the one or more paging messages are non-colliding with the received one or more sounding reference signals.

23. The apparatus of claim 19, wherein at least one registration request message of the quantity of registration request messages is a type two registration request message indicating an update to an existing registration of the second subscriber identity module.

24. The apparatus of claim 19, further comprising:
  means for determining a threshold number of registration request messages for transmission over a time interval in accordance with the registration request messaging threshold; and
  means for transmitting a set of registration request messages during the time interval based at least in part on the collision, wherein the quantity of registration request messages is less than or equal to the threshold number of registration request messages.

25. The apparatus of claim 19, wherein the second registration message comprises a registration accept message.

26. The apparatus of claim 19, wherein the first subscriber identity module comprises a dedicated data subscription of the UE, and the second subscriber identity module comprises a non-dedicated data subscription service of the UE.

27. The apparatus of claim 19, wherein the first subscriber identity module corresponds to a connected state of the UE, and the second subscriber identity module corresponds to an idle state of the UE.

28. A non-transitory computer-readable medium storing code for wireless communication at a user equipment (UE), the code comprising instructions executable by a processor to cause the processor to perform a method comprising:
  receiving, by a first subscriber identity module of the UE, a control message indicating a set of sounding reference signal resources for one or more sounding reference signals in accordance with a first periodicity;
  receiving, at a second subscriber identity module of the UE, a registration message comprising a first parameter that indicates a first set of paging occasions for one or more paging messages in accordance with a second periodicity;
  transmitting, transmitting, in accordance with a registration request messaging threshold, a quantity of registration request messages based at least in part on a collision in time between a sounding reference signal resource of the set of sounding reference signal resources and a paging occasion of the first set of paging occasions, wherein the quantity of registration request messages satisfies the registration request messaging threshold; and
  receiving a second registration message in response to the quantity of registration request mess-age messages, the second registration message comprising a second parameter that indicates a second set of paging occasions for the one or more paging messages in accordance with a third periodicity.

29. The non-transitory computer-readable medium of claim 28, wherein the first parameter comprises a first temporary mobile subscriber identity and the second parameter comprises a second temporary mobile subscriber identity, and the instructions are further executable by the processor to cause the processor to perform a method comprising:
  determining the first set of paging occasions and the second set of paging occasions for the one or more paging messages based at least in part on the respective first and second temporary mobile subscriber identities; and
  determining the third periodicity based at least in part on the second temporary mobile subscriber identity associated with the second set of paging occasions.

30. The non-transitory computer-readable medium of claim 29, wherein the first temporary mobile subscriber identity and the second temporary mobile subscriber identity indicate one or more paging offset values associated with the first set of paging occasions and the second set of paging occasions.

* * * * *